United States Patent Office 2,947,753
Patented Aug. 2, 1960

2,947,753

N-(β-PHENYLETHYL)-4-PHENYL-4-CARBOALK-OXYPIPERIDINES AND PROCESSES OF PREPARING THEM

Karl Pfister III, Westfield, and Arsenio A. Pessolano, Linden, N.J., assignors to Merck & Co., Inc., Rahway, N.J., a corporation of New Jersey No Drawing. Filed May 26, 1955, Ser. No. 511,413

5 Claims. (Cl. 260—294.3)

This invention is concerned generally with novel piperidine compounds and with processes for preparing these piperidine derivatives. More particularly, it relates to N-(β-phenyethyl)-4-phenyl-4-carboalkoxypiperidine compounds, and salts thereof, new compounds which possess superior analgesic activity, and to the process of preparing these new analgesic substances starting with 4-phenyl-4-carboalkoxypiperidine.

The N-(β-phenylethyl)-4-phenyl-4-carboalkoxypiperidines, and their salts, subject of the present invention may be chemically represented by the following structural formula:

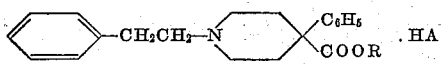

wherein R is a methyl or ethyl radical, and HA is an acid.

The chemical relationship of N-(β-phenylethyl)-4-phenyl-4-carbomethoxypiperidine and N-(β-phenylethyl)-4-phenyl-4-carboethoxy-piperidine to the well-known analgesic, meperidine, is clear from a comparison of the foregoing formula with the structural formula of meperidine which is as follows:

Although meperidine has been widely used as an analgesic, its toxicity has been a disadvantage in many instances. A large number of N-substituted analogues of meperidine have been prepared heretofore in the hope of obtaining a compound having comparable analgesic activity to meperidine and reduced toxicity, but none of the compounds thus prepared have offered a satisfactory substitute for meperidine. There was no reason to expect from this prior work that this line of investigation would lead to an improved analgesic of the meperidine type, since it was found that increasing the molecular size of the N-substituent actually increases the toxicity and reduces the analgesic activity (e.g. N-benzyl-4-phenyl-4-carboethoxypiperidine is reported to possess only one-half the analgesic activity of meperidine).

Surprisingly enough, the new compounds, N-(β-phenylethyl)-4-phenyl-4-carbomethoxypiperidine and N-(β-phenylethyl)-4-phenyl-4-carboethoxy-piperidine, and salts thereof, have been found to be only one-third as toxic as meperidine and to be twice as potent as analgesics; at comparable analygesic activity, the toxicity of N-(β-phenylethyl)-4-phenyl-4-carbomethoxypiperidine and N-(β-phenylethyl)-4-phenyl-4-carboethoxy-piperidine is only one-sixth that of meperidine.

The N-(β-phenylethyl)-4-phenyl-4-carbomethoxypiperidine, N-(β-phenylethyl)-4-phenyl-4-carboethoxypiperidine, and salts thereof, can be prepared by reactions which may be chemically represented as follows:

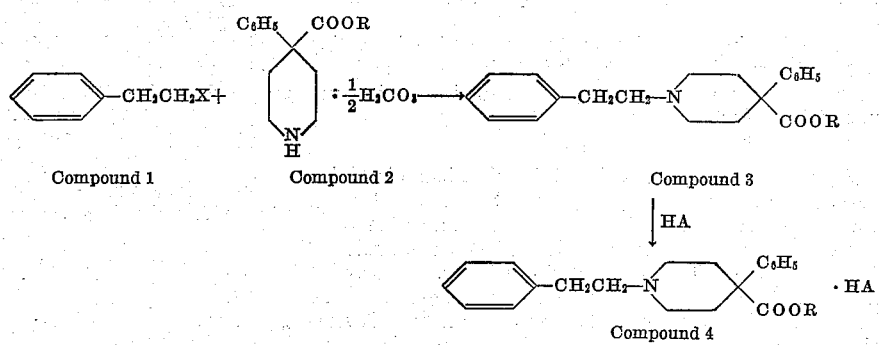

Compound 1    Compound 2    Compound 3

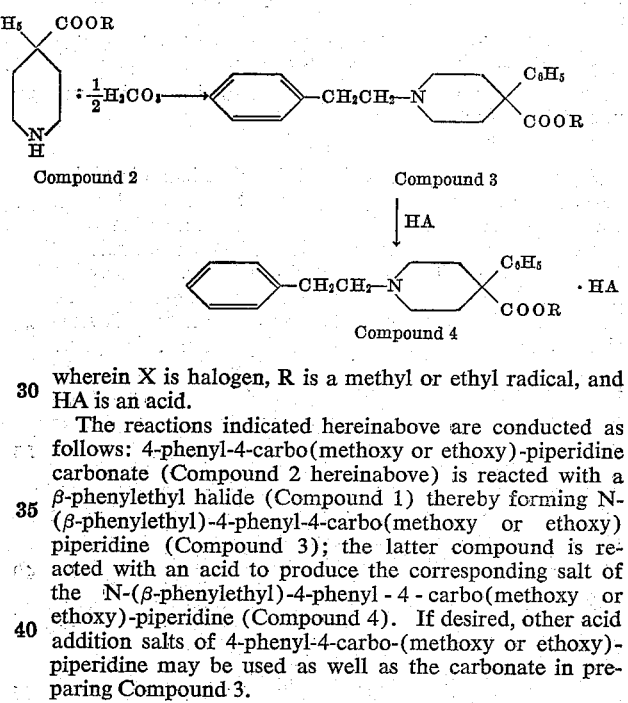

Compound 4 wherein X is halogen, R is a methyl or ethyl radical, and HA is an acid.

The reactions indicated hereinabove are conducted as follows: 4-phenyl-4-carbo(methoxy or ethoxy)-piperidine carbonate (Compound 2 hereinabove) is reacted with a β-phenylethyl halide (Compound 1) thereby forming N-(β-phenylethyl)-4-phenyl-4-carbo(methoxy or ethoxy) piperidine (Compound 3); the latter compound is reacted with an acid to produce the corresponding salt of the N-(β-phenylethyl)-4-phenyl-4-carbo(methoxy or ethoxy)-piperidine (Compound 4). If desired, other acid addition salts of 4-phenyl-4-carbo-(methoxy or ethoxy)-piperidine may be used as well as the carbonate in preparing Compound 3.

The reaction between the 4-phenyl-4-carbo(methoxy or ethoxy)piperidine carbonate and the β-phenylethyl halide is conveniently conducted by heating the reactants together in a liquid medium which is substantially inert under the reaction conditions and which is a solvent for the reactants. We ordinarily utilize, as the liquid medium, a lower alkanol such as ethanol, and prefer to conduct the reaction by heating the reactants together in said alkanol solvent under reflux in the presence of a base for example an alkali metal bicarbonate such as sodium bicarbonate. As the β-phenylethyl halide starting material, we can utilize the chloride, bromide or iodide, but we ordinarily prefer to employ either β-phenylethyl chloride or β-phenylethyl bromide. Utilizing these preferred reactants and under the preferred reaction conditions, the reaction is ordinarily substantially complete in about one to two days. The N-(β-phenylethyl)-4-phenyl-4-carbo(methoxy or ethoxy)piperidine thus formed is conveniently recovered from the reaction mixture by removing the inorganic salts by filtration, and evaporating the resulting alcoholic solution to dryness in vacuo. The residual material is triturated with water, the water is decanted, and the washed material is dried in vacuo to give N-(β-phenylethyl)-4-phenyl-4-carbo(methoxy or ethoxy)piperidine base. The conversion of the N-(β-phenylethyl)-4-phenyl-4-carbo(methoxy or ethoxy)piperidine base to the corresponding salts is ordinarily conducted by reacting the N-(β-phenylethyl)-4-phenyl-4-carbo(methoxy or ethoxy)piperidine base, under substantially anhydrous conditions with an acid as, for example, hydrogen chloride, hydrogen bromide, sulfuric acid, and the like. This salt-forming reaction is conveniently carried out in a medium comprising a lower alkanol, such as ethanol, methanol, propanol, and the like. Upon diluting the alkanol reaction medium with ether, there precipitates the salt of the N-(β-phenylethyl)-4-phenyl-4-carbo-(methoxy or ethoxy) piperidine such as N-(β-phenylethyl)-4-phenyl-4-carbomethoxypiperidine hydrochloride, N-(β-phenylethyl)-4-phenyl-4-carbomethoxypiperidine hydrobromide, N-(β-phenylethyl)-4-phenyl-4-carbomethoxypiperidine sulfate, N-(β-phenylethyl)-4-phenyl-4-carboethoxypiperidine hydrochloride, N-(β-phenylethyl)-4-phenyl-4-carboethoxypiperidine hydrobromide, N-(β-phenylethyl)-4-phenyl-4-carboethoxypiperidine sulfate, and the like. The salt thus formed is recovered from the alcoholic slurry by filtration or centrifugation.

The following examples illustrate methods of carrying out the present invention, but it is to be understood that these examples are given for purposes of illustration and not of limitation.

Example 1

A mixture of 7 g. of 4-phenyl-4-carboethoxypiperidine carbonate, 4.44 g. of β-phenylethyl bromide, 4.2 g. of sodium bicarbonate and 60 ml. of absolute ethanol is heated under reflux for a period of approximately 48 hours. The reaction mixture is filtered thereby removing inorganic salts, and the ethanol is evaporated from the filtered solution in vacuo. The residual material is slurried with ether, filtered to remove additional inorganic material and the insoluble material washed with additional ether. The filtered ether solution and washings may be evaporated to dryness to give N-(β-phenylethyl)-4-phenyl-4-carboethoxypiperidine base.

Alternatively hydrogen chloride gas is added to the combined filtered ether solution and ether washings, whereupon a crystalline precipitate forms immediately; this crystalline precipitate is recovered by filtration and purified by recrystallization from ethanol-ether to give approximately 4 g. of substantially pure β-(phenylethyl)-4-phenyl-4-carboethoxypiperidine hydrochloride; M.P. 190–192° C. Anal. calc'd. for $C_{22}H_{27}NO_2 \cdot HCl$: C, 70.66; H, 7.55; found: C, 70.46; H, 7.31.

Instead of adding hydrogen chloride gas to the combined ether solution and washings containing the N-(β-phenylethyl)-4-phenyl-4-carboethoxypiperidine base we can add sulfuric acid, phosphoric acid, citric acid, oxalic acid, or hydrogen bromide to such ether solution thereby precipitating the corresponding salt which is recovered by filtration and dried to give, respectively, N-(β-phenylethyl)-4-phenyl-4-carboethoxypiperidine sulfate, N-(β-phenylethyl)-4-phenyl-4-carboethoxypiperidine phosphate, N-(β-phenylethyl)-4-phenyl-4-carboethoxypiperidine citrate, N-(β-phenylethyl)-4-phenyl-4-carboethoxypiperidine oxalate, or N-(β-phenylethyl)-4-phenyl-4-carboethoxypiperidine hydrobromide.

Example 2

A mixture of 3.6 g. of 4-phenyl-4-carbomethoxypiperidine carbonate, 2.8 g. of phenylethyl bromide, 2.3 g. of sodium bicarbonate, and 35 cc. of absolute ethanol, is heated under reflux, with stirring, for a period of approximately 40 hours. The reaction mixture is filtered thereby removing inorganic salts which are washed with three 15 cc. portions of absolute ethanol. The combined ethanolic filtrate and washings are evaporated in vacuo to a crystalline mush which is dissolved in a mixture of 15 cc. of ether and 15 cc. of water. The layers are separated and the aqueous layer is extracted with 15 cc. of ether. The combined ether extracts are dried over anhydrous magnesium sulfate and the dried ethereal solution may be evaporated to dryness to give N-(β-phenylethyl)-4-phenyl-4-carbomethoxypiperidine base.

Alternatively hydrogen chloride gas is added to the combined ether extracts containing the N-(β-phenylethyl)-4-phenyl-4-carbomethoxypiperidine base whereupon N-(β-phenylethyl)-4-phenyl-4-carbomethoxypiperidine hydrochloride precipitates immediately, and is recovered by filtration to give about 3.8 g. of crude hydrochloride. This material is purified by recrystallization from ethanol-ether to give about 3.3 g. of substantially pure N-(β-phenylethyl)-4-phenyl-4-carbomethoxypiperidine hydrochloride; M.P. 224–225° C. Calc'd for $C_{21}H_{25}O_2N \cdot HCl$: C, 70.07; H, 7.28; N, 3.89; found: C, 70.05; H, 7.32; N, 3.90.

In accordance with the foregoing procedure and utilizing, in place of the anhydrous hydrogen chloride there employed, other anhydrous acids such as sulfuric acid, phosphoric acid, citric acid, oxalic acid or hydrogen bromide, there are obtained respectively N-(β-phenylethyl)-4-phenyl-4-carbomethoxypiperidine sulfate, N-(β-phenylethyl)-4-phenyl-4-carbomethoxypiperidine phosphate, N-(β-phenylethyl)-4-phenyl-4-carbomethoxypiperidine citrate, N-(β-phenylethyl)-4-phenyl-4-carbomethoxypiperidine oxalate, N-(β-phenylethyl)-4-phenyl-4-carbomethoxypiperidine hydrobromide, and the like.

The new compounds obtained as described hereinabove have been named as substituted piperidines. Alternatively they may be considered as derivatives of isonipecotic acid. Thus N-(β-phenylethyl)-4-phenyl-4-carbomethoxypiperidine may also be named as methyl 1-phenylethyl-4-phenyl-isonipecotate, and N-(β-phenylethyl)-4-phenyl-4-carboethoxy-piperidine named as ethyl-1-phenylethyl-4-phenyl-isonipecotate.

Various changes and modifications may be made in carrying out the present invention without departing from the spirit and scope thereof. Insofar as these changes and modifications are within the purview of the annexed claims, they are to be considered as part of our invention.

We claim:
1. N-(β-phenylethyl)-4-phenyl-4-carboethoxypiperidine.
2. N-(β-phenylethyl)-4-phenyl-4-carboethoxypiperidine hydrochloride.
3. N-(β-phenylethyl)-4-phenyl-4-carboethoxypiperidine phosphate.
4. N-(β-phenylethyl)-4-phenyl-4-carbomethoxypiperidine hydrochloride.
5. A compound selected from the group consisting of compounds of the formula:

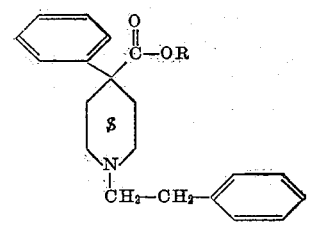

where R is selected from the group consisting of methyl and ethyl, and acid addition salts.

References Cited in the file of this patent

UNITED STATES PATENTS

| | | |
|---|---|---|
| 2,167,351 | Eisleb | July 25, 1939 |
| 2,486,795 | Kaegi | Nov. 1, 1949 |

OTHER REFERENCES

Gilman et al.: J. Amer. Chem. Soc., vol. 47, pp. 251–252 (1925).

Simons: Ind. and Eng. Chem., vol. 39, p. 238 (1947).